Oct. 17, 1944. T. R. SMITH 2,360,732
HYDRAULIC COUPLING
Filed Sept. 11, 1942
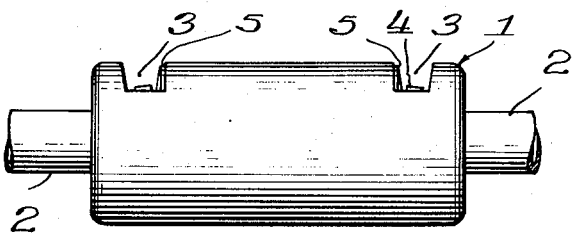
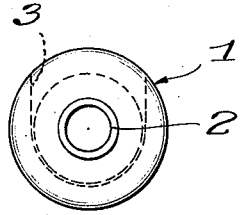
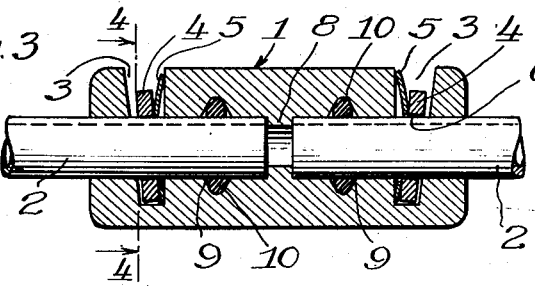
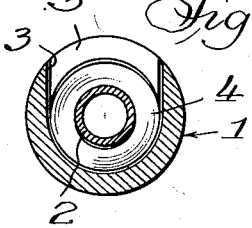
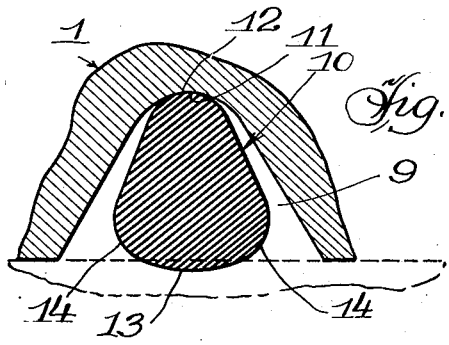
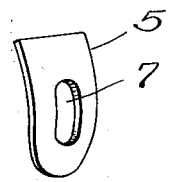
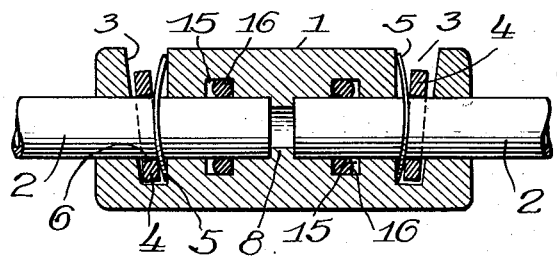
INVENTOR.
Thomas R. Smith
BY Parkinson & Lau Attys.
Witness:
Chas. R. Koursh.

Patented Oct. 17, 1944

2,360,732

UNITED STATES PATENT OFFICE 2,360,732

HYDRAULIC COUPLING

Thomas R. Smith, Newton, Iowa, assignor to The Maytag Company, Newton, Iowa, a corporation of Delaware Application September 11, 1942, Serial No. 457,913

4 Claims. (Cl. 285—174)

The present invention relates to a novel coupling for quickly and securely joining together the ends of two pipes or sections of tubing without the aid of any tools. The novel coupling is particularly adapted for joining two tube sections or conduits carrying fluid and for sealing these tubes against leakage.

Among the objects of the present invention is to provide a novel coupling assembly for joining together aligned sections of tubing or pipe and in which these sections are securely retained and the fluid carried thereby effectively sealed against leakage or contamination.

The novel invention further comprehends a coupling assembly in which adjacent ends of tubing or pipe sections may be inserted and automatically locked against accidental or unintentional removal. The pipes or tubing are also automatically sealed against leakage of the fluid carried thereby and this locking and sealing action is maintained regardless of the pressure of the fluid.

Another object of the invention is to provide a novel sealing action in which the seal is effective to prevent leakage of fluid at any pressure, whether it be extremely high or low, and which seal permits the pipe sections or tubing to move a limited amount back and forth in the coupling without effecting the sealing action.

The present invention is particularly adapted for coupling tubing or pipe sections employed in aircraft work, or in other constructions or operations where extremely high pressures are encountered in use.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in side elevation of the novel hydraulic coupling.

Figure 2 is a view in end elevation of this coupling.

Figure 3 is a longitudinal view in vertical cross-section through the coupling with the coupled sections of tubing or pipe being shown in side elevation.

Figure 4 is a view in vertical cross-section taken in a plane represented by the line 4—4 in Figure 3.

Figure 5 is a fragmentary enlarged view in vertical cross-section through the wedge-shaped sealing element and groove to show more clearly their contour and relationship.

Figure 6 is a view in perspective of the spring washer for the coupling.

Figure 7 is a view similar to Figure 3, but showing an alternate construction of seal.

Referring more particularly to the drawing and the novel embodiment therein selected to illustrate the invention, the coupling comprises a member 1 provided with aligned openings for the reception of a pair of tube sections or pipes 2. Adjacent each end of the coupling member 1 are formed slots or recesses 3—3 for the reception of a lock washer 4 and a spring washer 5. The lock washer is provided with an opening 6 slightly larger than the diameter or cross-section of the tube or pipe sections 2, while the spring washer 5 is provided with an opening 7 for the ready insertion or removal of the tube or pipe sections. These spring washers are shown as bowed in a manner to apply pressure against the lock washers 4 to thereby tilt these lock washers and cause them to grip the pipe sections 2 and retain them against accidental or unintentional removal. To permit this tilting movement of the lock washer, the slot 3 is tapered inwardly and downwardly in such manner that its base is of a width to accommodate the lower ends of the lock washer 4 and spring washer 5, whereby any pressure of the spring washer against the lock washer will cause the upper portion of the latter to tilt or pivot about the base of the slot in a manner to tightly grip the tube or pipe section as more clearly shown in Figure 3.

This construction permits these tube or pipe sections to be readily inserted into the coupling with their inner ends abutting a shouldered portion 8, and when thus inserted, the encompassing lock washer will automatically grip its pipe or tube section and lock it in position.

In order to effectively seal against leakage of the hydraulic fluid under all conditions of operation or use, the coupling is formed with a substantially V-shaped groove or recess 9 spaced from the shoulder 8 a distance sufficient to seal the pipe or tube section even though it may not abut the shoulder, and to permit a limited longitudinal movement of the tube or pipe sections within the body of the coupling. Within this substantially V-shaped groove or recess 9 is mounted a substantially wedge-shaped, resilient sealing element or packing 10 preferably formed of a natural rubber compound or of a compounded synthetic rubber, suitable for the purpose.

As more clearly shown in Figure 5 of the drawing, the angle made by the substantially V-shaped groove is approximately 60°, while that made by the side walls of the sealing element is approximately 45°, so that the angle of the groove is somewhat greater than the angle of the sealing element to thereby permit this sealing element to slip or pivot about its vertex 11 from one side of the groove to the other. The vertex of the sealing element has a radius preferably slightly less than but approximately conforming to the radius at the base 12 of the V-shaped groove in which it pivots. The base of the sealing element is also curved at 13 and at its corners 14, 14, the curvature of the base being such as to maintain approximately the same amount of squeeze or compression as the sealing member slips from one side of the groove to the other, while the curvature at the corners is such as to prevent these corners from being extruded or pinched at the sealing edges between the body of the coupling and the pipe or tubing 2.

Figure 7 shows an alternate form of coupling in which the body 1 of the coupling is formed with a pair of annular, channel-shaped grooves 15 adapted to receive a toroidal sealing element 16. This sealing element is of a greater diameter than the depth of the channel-shaped groove 15 so as to be compressed as the pipe or tube sections 2 are inserted into the coupling. In other respects, this construction of coupling is similar in structure and operation as that shown in Figures 1 to 6, inclusive.

The above construction is unique in its operation, in that it can be assembled without any tools and it is only necessary to insert the ends of the tube or pipe sections in each end of the coupling to complete the joint. The joint when so assembled will withstand extremely high hydraulic pressure. This novel result is obtained by dividing the sealing effect and the holding effect into separate components. With the holding effect and the sealing effect independent, the tube sections may be more quickly and easily inserted into the coupling. Should the tubing start to pull out, the lock washer 4 and spring washer 5 act to place a vise-like grip on the tubing to thereby prevent any accidental or unintentional dis-engagement of the tube sections from the coupling. Should it become necessary to remove either tube section, only a screw driver or similar instrument is needed to pry over the lock washer to release its grip upon the tube section and permit the section to be removed.

Having thus disclosed my invention, I claim:

1. An hydraulic coupling for connecting adjacent sections of tubing, comprising a member formed with an opening at each end thereof, a transverse groove provided in the member adjacent its opposite ends, a lock washer and a cooperating spring washer located in each groove and provided with aligned openings to receive a tube section, said groove being so proportioned and the lock washer and cooperating spring washer being so constructed and arranged that the spring washer automatically forces the lock washer to engage and anchor the tube section in the coupling and prevent it from being accidentally or unintentionally withdrawn, and means for sealing the coupling against leakage of the fluid carried by the tubing.

2. An hydraulic coupling for connecting adjacent sections of tubing, comprising a member formed with an opening at each end thereof, a transverse and downwardly and inwardly tapering groove provided in the member adjacent each end thereof, a lock washer and cooperating spring washer located in each groove and provided with aligned openings to receive a tube section, the opening in the lock washer being of greater diameter than the diameter of the tube section to permit the lock washer to pivot about its lower end in the groove under pressure of the spring washer and grip and anchor its tube section against accidental or unintentional removal, and means for sealing the coupling against leakage of the fluid carried by the tubing.

3. An hydraulic coupling for connecting adjacent sections of tubing, comprising a member formed with an opening at each end thereof, a transverse and downwardly and inwardly tapering groove provided in the member adjacent each end thereof, a lock washer and cooperating spring washer located in each groove and provided with aligned openings to receive a tube section, the opening in said lock washer being of greater diameter than the diameter of the tube section to permit the lock washer to pivot in the groove about its lower end under pressure of the spring washer and grip and anchor its tube section against accidental or unintentional removal, a recess formed in the member to encompass the tube section when inserted, and a resilient sealing element provided in the recess and adapted to tensionally grip the tube section and seal against leakage or contamination of the hydraulic fluid carried by the tubing.

4. A coupling for joining adjacent sections of tubing, comprising a connector for receiving the ends of the adjacent sections, means in the sections for gripping and retaining the tube sections in the connector, a substaintially V-shaped groove in the connector having a curved base, a substantially wedge-shaped resilient packing carried in the groove with its vertex curved in subtsantial conformity with the base of the groove and its sides forming an angle less than the angle formed by the sides of the groove, the base of said packing engaging the tube section to form a sealing contact therewith.

THOMAS R. SMITH.